Nov. 9, 1971 P. M. WILSON 3,618,230

TIRE DRYING AND CONDITIONING MACHINE

Filed Aug. 21, 1970 3 Sheets-Sheet 1

INVENTOR.
PHILLIP M. WILSON
BY Polachek & Saulsbury
ATTORNEYS

Nov. 9, 1971 P. M. WILSON 3,618,230
TIRE DRYING AND CONDITIONING MACHINE
Filed Aug. 21, 1970 3 Sheets-Sheet 2

INVENTOR.
PHILLIP M. WILSON
BY Polachek & Saulsbury
ATTORNEYS

INVENTOR.
PHILLIP M. WILSON

United States Patent Office 3,618,230
Patented Nov. 9, 1971

3,618,230
TIRE DRYING AND CONDITIONING MACHINE
Phillip M. Wilson, Hartford, Ill.
(133 Whitelaw Ave., Wood River, Ill. 62095)
Filed Aug. 21, 1970, Ser. No. 65,883
Int. Cl. F26b 25/00
U.S. Cl. 34—68       10 Claims

ABSTRACT OF THE DISCLOSURE

A tire drying machine has a horizontal platform on which is a vertical post carrying an axially horizontal stationary cylindrical body. A motor driven shaft is carried by the body in an elevated position and revolves tires axially mounted on the body. A housing carried by the body supports heating lamps exposed to interiors of tires revolving with the shaft. A motor driven fan may circulate cooling air through the housing. Guide members on the shaft keep the tires from wandering axially while revolving.

---

The present invention relates to tire drying machines used for preconditioning a tire prior to retreading or recapping.

In the recapping of tires, it is necessary to have the tire well dried out before a coating of rubber is applied. If the tire is not sufficiently dry when the new coating of rubber is applied, the moisture will be trapped in the tire fabric. Later, the heat applied during recapping of the tire will vaporize the moisture, which may then start separation of the cord plies of the tire fabric. The trapping of moisture is especially likely to occur in the present day tires which include modern manufactured filaments of rayon, nylon and the like. These filaments tend to retain moisture which causes separation of the plies. Sometimes, the carcass of a tire to be recapped is defective and contains separated plies. Such a tire should not be retreated or recapped since it will fail in use. The separation of the plies is generally not apparent when the plies contain moisture. However, thorough drying will reveal this condition by causing the separated plies to curl up. The need has therefore long existed for a practical, relatively inexpensive, reliable tire drying machine which can be installed in tire shops having just a few tires to be dried at a time.

Prior tire drying machines heretofore proposed have been large, cumbersome, complex and expensive, and not adapted for use in a relatively small installation such as required in the usual tire recapping shop. Generally such machines had numerous heat lamps located on a rack externally of the rotating tires being dried. This arrangement was very wasteful of heat power. Typical machines of this type are described in U.S. Pats. 2,498,560 and 2,872,740. In another type of machine the tires are stationary and stacked in a pile. Drying lamps are disposed axially of the stack and are rotated during the drying operation. A typical machine of this type is described in U.S. Pat. 2,912,558. This machine has many disadvantages and objections. In the first place, the tires do not dry uniformly and thoroughly because they are piled one on the other, while air heated by the lamps rises vertically and escapes. The tires are thus heated and dried only by radiation and not by conduction or convection, which is very inefficient. Also the machine mentioned cannot be used conveniently for different sizes of tires, nor is there any means for preventing tries on the bottom from collapsing under the weight of tires above, so the bottom tires do not dry properly.

The present invention is directed at overcoming the above and other difficulties and disadvantages of prior tire drying machines. The new machine described herein is relatively simple in construction and easy to operate. It will accommodate one or more tires at a time of the same or different sizes. The tires rotate on horizontal axes and do not shield each other from the heat of drying lamps. The machine can be built in large sizes to handle heavy truck tire casings and large tires of earth moving machines.

Other and further features, objects and advantages of the invention will become apparent from the following detailed description taken together with the drawings, wherein.

Figure 7:
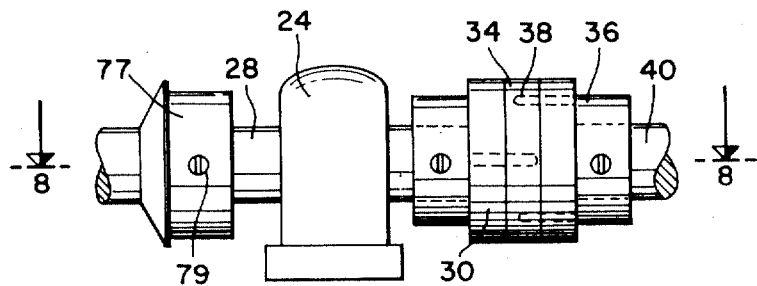
FIG. 7 is an enlarged fragmentary side view similar to a portion of FIG. 2, showing a shaft coupling arrangement.
Figure 8:
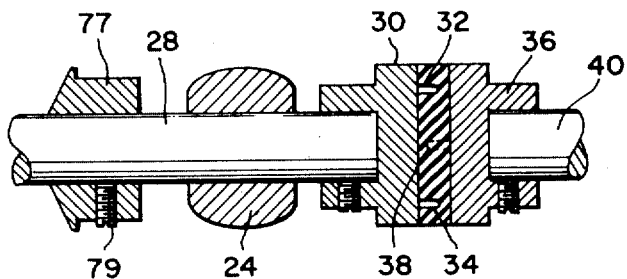
FIG. 8 is an axial sectional view taken on line 8—8 of FIG. 7.

Referring to the drawings, there is shown a tire drying machine 10 comprising a massive horizontal flat base or platform 12 provided with lateral vertical flanges 14. Casters 16 can be attached to the flanges by brackets 18. An axially vertical hollow post 20 is welded to the top of the platform near one end. Welded to the top of this post is an axially horizontal cylindrical body 22. The body 22 extends horizontally over the platform and has a free outer or distal end 23. Mounted on body 22 are two bearings 24, 26 which rotatably support a driven shaft 28 radially spaced above body 22 and axially parallel therewith. Secured to shaft 28 is a coupling head 30; see FIGS. 7 and 8. This head has pins 32 engaged in a flexible rubber coupling pad 34. Another coupling head 36 has pins 38 engaged in pad 34. Head 36 is secured on drive shaft 40 of a speed reducer assembly 42. The speed reducer is mounted on a base block 44 secured to body 22 near end 21. Drive motor 46 is coupled to the housing of the speed reducer 42; see FIGS. 1, 2 and 3. A terminal and switch box 48 is secured to end 21 of body 22 as clearly shown in FIGS. 1 and 2. Power supply cable 49 terminating in plug 51 is connected to box 48. Brace bars 50 are welded to platform 12 and to post 20 to reinforce and stabilize the assembly of post and body 22.

Secured to the underside of body 22 is a sheet metal housing 52. This housing has lateral flanges 54 secured by bolts 56 to body 22. The housing 52 has upper slanted side walls 58 provided with holes 59 for circulation of air around wires and lamp bases inside the housing. Removable end plate 60 at the end of the housing is further provided with holes 62 for air circulation inside the housing. Opposite, inclined lower walls 64 of the housing are formed with holes 65 laterally spaced apart along these walls. Drying and heating lamp bulbs 66 extend outwardly of these holes.

Figure 5:
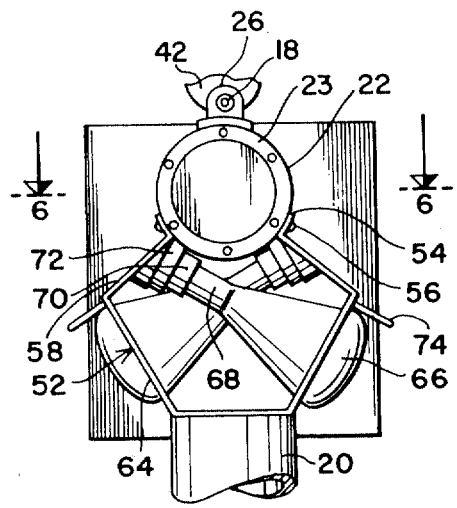
FIG. 5 is an enlarged end view of a portion of the machine, similar to part of FIG. 3 with an end plate removed to internal construction.

The lamp bulbs 66 are arranged in pairs with necks 68 crossing as best shown in FIG. 5. The lamps are engaged in sockets 70 attached to brackets 72 mounted at inner sides of upper walls 58. A pair of rods 74 have bent ends 75 secured to ends of lower walls 64. These rods extend longitudinally of the housing laterally thereof above the lamp bulbs to protect the same against accidental contact. Two or more tire guide collars 77 can be slidably mounted on shaft 28 and adjustably held by set screws 79.

Figure 1:
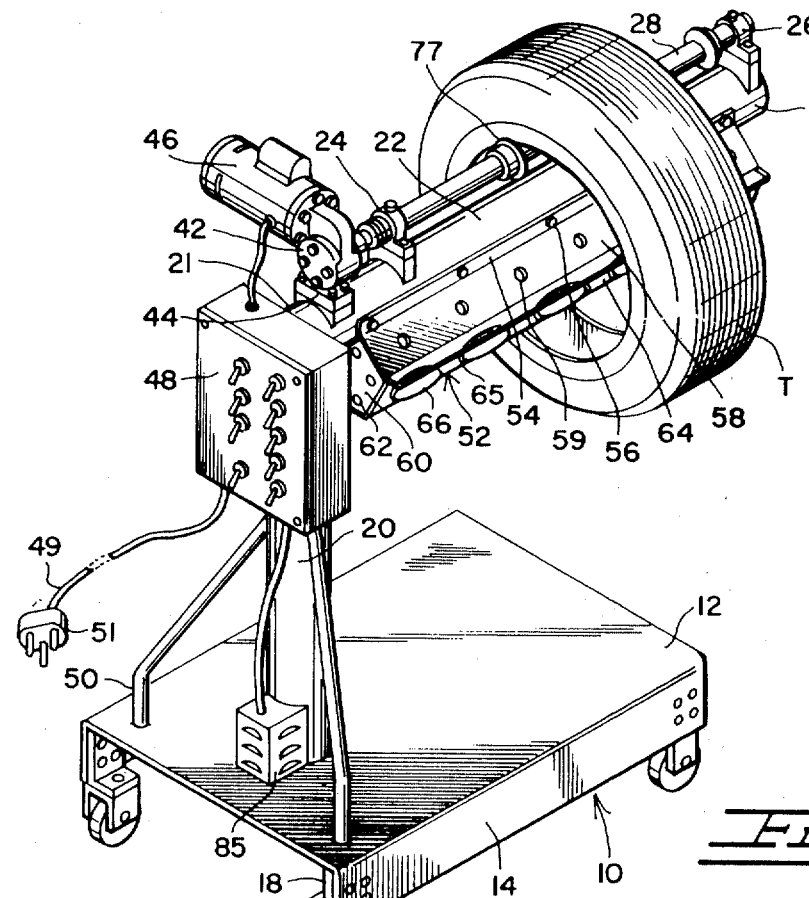
FIG. 1 is a perspective view of a tire drying machine embodying the invention, with a tire mounted thereon for drying.
Figure 2:
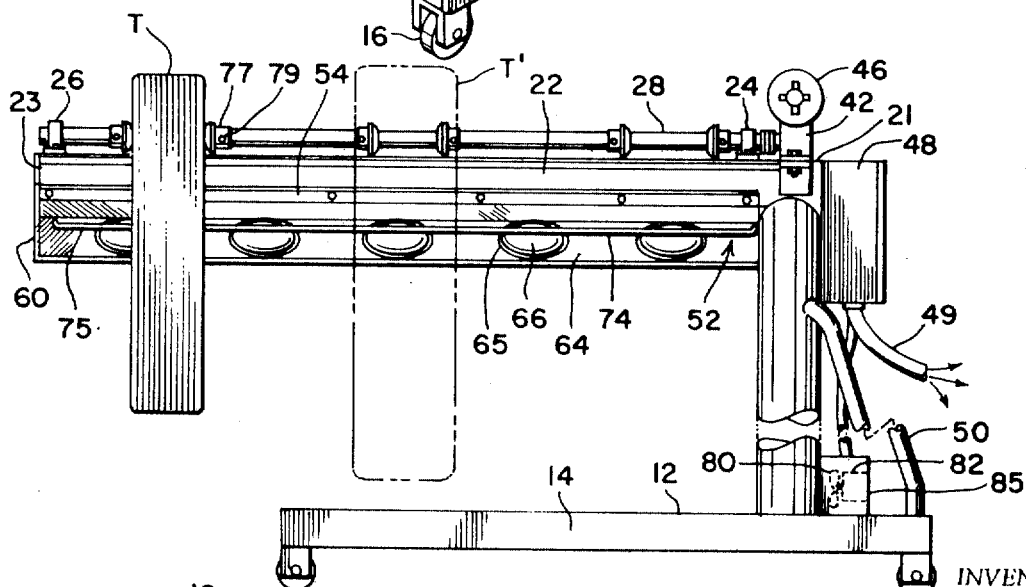
FIG. 2 is a side view of the tire drying machine.
Figure 3:
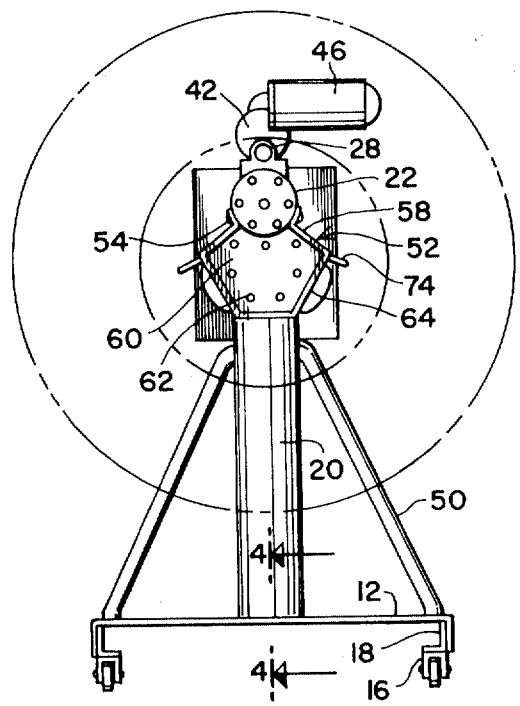
FIG. 3 is an end view of the machine.
Figure 4:
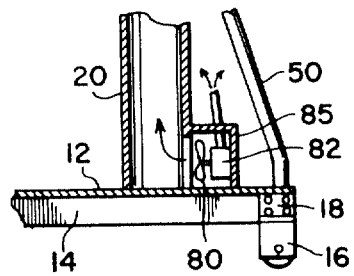
FIG. 4 is a fragmentary vertical sectional view taken on line 4—4 of FIG. 3.
Figure 6:
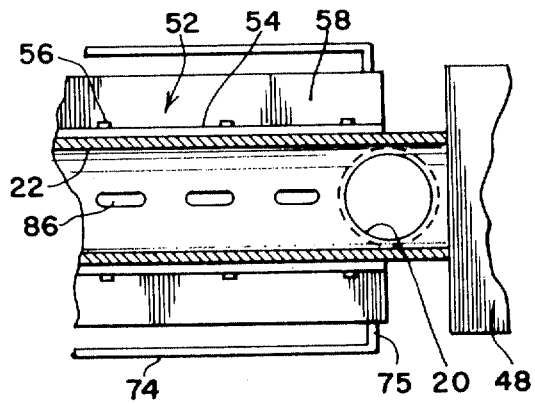
FIG. 6 is a fragmentary horizontal plan view taken on line 6—6 of FIG. 5.

If the heat generated inside the housing 52 is excessive, a forced air draft can be provided by means of a fan 80 driven by a motor 82 mounted in housing 85 at the base of post 20; see FIGS. 1, 2, and 4. The air draft passes up the post and longitudinally along hollow body 22. Body 22 is provided with holes or slots 86 in the bottom to pass the air draft into the housing 52; see FIG. 6.

Figure 9:
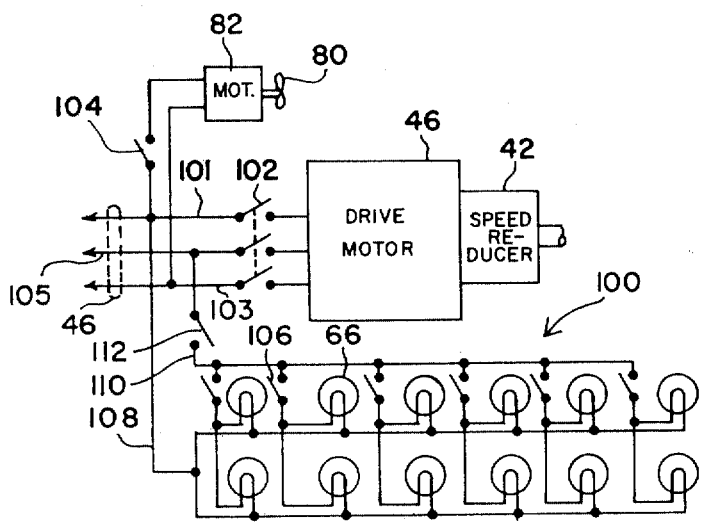
FIG. 9 is a diagram of the electrical circuitry of the machine.

The electrical circuit 100 of the machine is shown in FIG. 9. Power supply cable 46 may be a three-wire line to which drive motor 46 is connected via ganged switches 102. The drive motor drives the speed reducer 42. Motor 82 which drives fan 80 is connected to one pair of wires 101, 103 via switch 104. Lamps 66 are arranged in pairs, and each pair is connected via an individual control switch 106 and lines 108, 110 to wires 103, 105. A master switch 112 can be connected in the lines for turning all lamps on and off at the same time. It will be noted that the drive motors 46, fan motor 82 and lamps 66 are all on parallel circuits so they can be independently turned on and off.

In operation of the machine, one or more tires T, T' etc. can be mounted on body 22 depending from shaft 28 which is rotated by the drive motor 46 via speed reducer 42. The tires revolve with the shaft as it rotates. The energized lamps 66 are exposed to the interior of the tire and dry it out thoroughly by radiation, air convection and conduction. Operation of fan 80 keeps lamp bases, sockets and associated wires cool inside housing 52. Guide collars 77 can be disposed laterally of any one or group of tires on shaft 28 to keep the tire from wandering axially while they revolve. The lamps also provide illuminated views of the interiors of the tire casings so any looseness, separation or curling of the plies can be readily detected.

The machine can be made up in large or small sizes. Any one machine will accommodate a plurality of tires of different sizes which can be dried at the same time. Use of the machine will avoid recapping or retreading of tire carcasses or casing which are defective by reason of having unbonded plies. Furthermore, the machine will effectively precondition the tire carcasses and casings for subsequent recapping and retreading. The machine is relatively simple in construction. It is rugged, durable and will have a long, useful service life.

What is claimed is:

1. A tire drying machine, comprising a platform; a post supported on said platform in an axially vertical position; a cylindrical body extending axially horizontal from said post and having a free outer end for axially receiving tires to be dried; a shaft; means rotatably supporting said shaft in axially horizontal position above said body and axially parallel thereto so that inner rims of the tires rest on the shaft and revolve as the shaft rotates; motor means operatively connected to said shaft for rotatably driving the same; a housing secured to the underside of said body; and heating lamps carried by said housing and exposed outwardly thereof to the interiors of the tires carried by said shaft for drying the tires as they revolve with the rotating shaft.

2. A tire drying machine as defined in claim 1, further comprising tire guide members adjustably mounted on said shaft and disposable laterally of the tires to keep them from wandering axially while the revolve around said body.

3. A tire drying machine as defined in claim 1, wherein said motor means comprises a speed reducer mounted on said body and connected by coupling means to said shaft to drive the same; and an electric motor connected to said speed reducer to drive the speed reducer.

4. A tire drying machine as defined in claim 1, wherein said housing comprises sheet metal walls formed with spaced holes, said lamps having inner ends engaged in sockets in the housing and outer ends extending outwardly of said holes, said lamps being arranged in pairs with the lamps in each pair extending outwardly of opposite side walls of the housing for drying any particular tire thereat.

5. A tire drying machine as defined in claim 4, further comprising an electric power supply circuit connected to each pair of lamps in circuit with individual switches, so that any pair of lamps can be turned on and off independently of any other pair of lamps.

6. A tire drying machine as defined in claim 4, further comprising an electric fan arranged to drive an air draft through said post and body for cooling wires and lamp sockets inside said housing.

7. A tire drying machine as defined in claim 4, further comprising guards for the lamps mounted on said housing and extending laterally thereof over the lamps to protect the same from accidental breakage.

8. A tire drying machine as defined in claim 4, wherein said motor means comprises a speed reducer mounted on said body and connected by coupling means to said shaft to drive the same; and an electric motor connected to said speed reducer to drive the speed reducer.

9. A tire drying machine as defined in claim 8, further comprising tire guide members adjustably mounted on said shaft and disposable laterally of the tires to keep them from wandering axially while they revolve around said body.

10. A tire drying machine as defined in claim 9, further comprising a switch and terminal box mounted on said post, said switches being mounted on said terminal box.

References Cited

UNITED STATES PATENTS

| | | | |
|---|---|---|---|
| 2,498,560 | 2/1950 | Leeth | 34—87 |
| 2,872,740 | 2/1959 | Schaevitz | 34—105 X |
| 2,912,558 | 11/1959 | Root | 219—342 |
| 3,160,734 | 12/1964 | Rylander | 34—240 X |

FREDERICK L. MATTESON, Jr., Primary Examiner

H. B. RAMEY, Assistant Examiner

U.S. Cl. X.R.

34—105